United States Patent
Leroux et al.

(10) Patent No.: US 9,617,956 B2
(45) Date of Patent: Apr. 11, 2017

(54) GAS INTAKE SYSTEM FOR A VEHICLE ENGINE

(71) Applicant: Valeo Systemes de Controle Moteur, Cergy Saint Christophe (FR)

(72) Inventors: Samuel Leroux, Poissy (FR); Stéphane Lestienne, Deuil la Barre (FR); Stéphane Sorin, Maison Laffite (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 225 days.

(21) Appl. No.: 14/361,063

(22) PCT Filed: Nov. 12, 2012

(86) PCT No.: PCT/FR2012/052592
§ 371 (c)(1),
(2) Date: May 28, 2014

(87) PCT Pub. No.: WO2013/079846
PCT Pub. Date: Jun. 6, 2013

(65) Prior Publication Data
US 2014/0331956 A1    Nov. 13, 2014

(30) Foreign Application Priority Data

Nov. 28, 2011  (FR) ..................... 11 60866

(51) Int. Cl.
*F02M 35/00* (2006.01)
*F02M 35/10* (2006.01)
*F02D 9/10* (2006.01)

(52) U.S. Cl.
CPC ........... *F02M 35/10* (2013.01); *F02D 9/1095* (2013.01); *F02M 35/10085* (2013.01); *Y10T 29/49* (2015.01)

(58) Field of Classification Search
CPC . F02D 9/1095; F02M 35/10; F02M 35/10085
(Continued)

(56) References Cited

U.S. PATENT DOCUMENTS 6,055,958 A * 5/2000 Aoyama ............... F02B 31/087
                                                    123/184.55
6,568,366 B2 * 5/2003 Dietz .................... F02B 31/085
                                                    123/184.21
(Continued)

FOREIGN PATENT DOCUMENTS

CA   WO 0136796 A1 * 5/2001 ............ F02B 31/06
DE   19707599 A1   8/1998
(Continued)

OTHER PUBLICATIONS

International Search Report issued in PCT/FR2012/052592 mailed on Dec. 21, 2012 (4 pages).
(Continued)

*Primary Examiner* — Marguerite McMahon
*Assistant Examiner* — Tea Holbrook
(74) *Attorney, Agent, or Firm* — Osha Liang LLP

(57) ABSTRACT

The invention relates to a device for controlling the ingress of intake gases to an engine, notably an internal combustion vehicle engine comprising cylinders, said device taking the form of a compartmentalized guide piece (6), each compartment (9) comprising a main duct (4) and a secondary duct (5) for gas, characterized in that the control device comprises a multitude of modules (8) each one delimiting a main duct (4) and a secondary duct (5), and in that the modules (8) constitute separate components designed to be fitted together.

15 Claims, 1 Drawing Sheet

(58) Field of Classification Search
USPC .......... 123/184.52, 184.38, 184.21, 184.26
See application file for complete search history.

(56) References Cited

U.S. PATENT DOCUMENTS

| | | | |
|---|---|---|---|
| 6,854,711 B2* | 2/2005 | Krause | B29C 45/0017 137/15.25 |
| 6,895,926 B1* | 5/2005 | Moreau | F02D 9/1095 123/184.61 |
| 7,162,997 B2* | 1/2007 | Madeira | F02B 31/085 123/336 |
| 8,082,900 B2* | 12/2011 | Germain | F02D 9/107 123/336 |
| 8,555,847 B2* | 10/2013 | Menin | F02B 31/06 123/184.21 |
| 9,267,471 B2* | 2/2016 | Kato | F02M 35/10255 |
| 2002/0108601 A1 | 8/2002 | Dietz et al. | |
| 2007/0017473 A1* | 1/2007 | Kondo | F02D 9/1065 123/184.53 |
| 2008/0035094 A1* | 2/2008 | Torii | F02D 9/103 123/188.14 |
| 2008/0035107 A1* | 2/2008 | Torii | F02D 9/103 123/336 |
| 2008/0127929 A1* | 6/2008 | Lancioni | F02M 35/10255 123/184.56 |
| 2008/0150278 A1* | 6/2008 | Lancioni | F02D 9/106 285/79 |
| 2008/0314352 A1* | 12/2008 | Brosseau et al. | F02B 31/06 123/184.56 |
| 2009/0194060 A1* | 8/2009 | Germain | F02D 9/107 123/195 A |
| 2009/0235891 A1* | 9/2009 | Kamiya | F02B 31/06 123/184.53 |
| 2011/0162611 A1 | 7/2011 | Zhang et al. | |
| 2013/0160736 A1* | 6/2013 | Matsuzaki | F02D 9/1075 123/337 |

FOREIGN PATENT DOCUMENTS

| | | | | |
|---|---|---|---|---|
| DE | 10112070 A1 | 9/2002 | | |
| DE | 103 41 393 B3 | 9/2004 | | |
| DE | 10 2004 013309 A1 | 10/2005 | | |
| DE | 102006000538 A1 | 6/2007 | | |
| DE | 102011087234 A1 * | 5/2013 | ....... | F02M 35/10255 |
| EP | 0 675 274 A1 | 10/1995 | | |
| EP | 0 726 388 A1 | 8/1996 | | |
| EP | 1085197 A2 | 3/2001 | | |
| EP | 1270917 A2 | 1/2003 | | |
| EP | 1 707 780 A1 | 10/2006 | | |
| EP | 2 088 303 A1 | 8/2009 | | |
| JP | 2010133275 A | 6/2010 | | |

OTHER PUBLICATIONS

Notice of Opposition issued in corresponding European Application No. 12795515.1, mailed on Sep. 29, 2016 (19 pages).

* cited by examiner

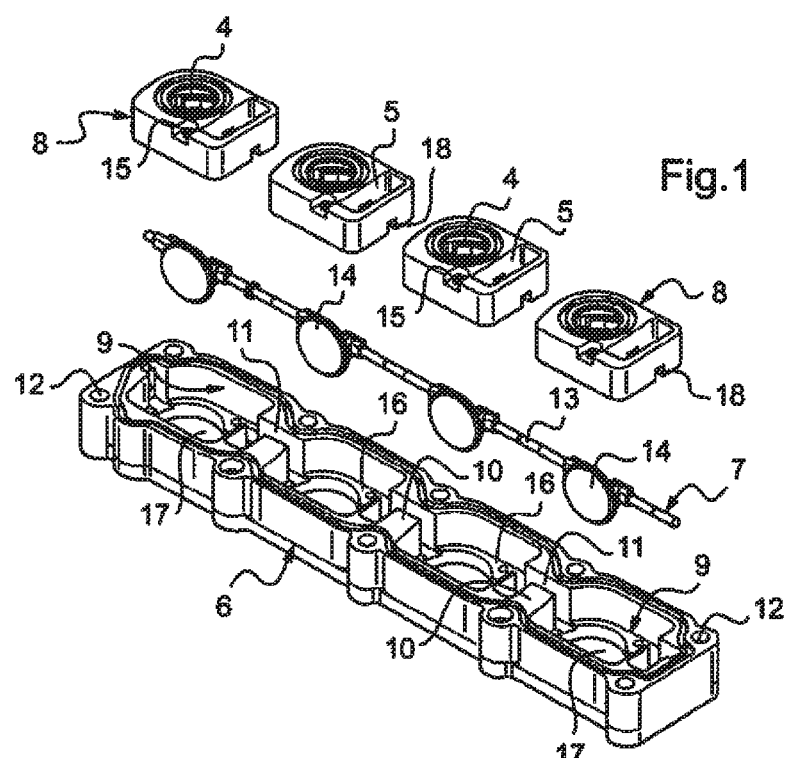
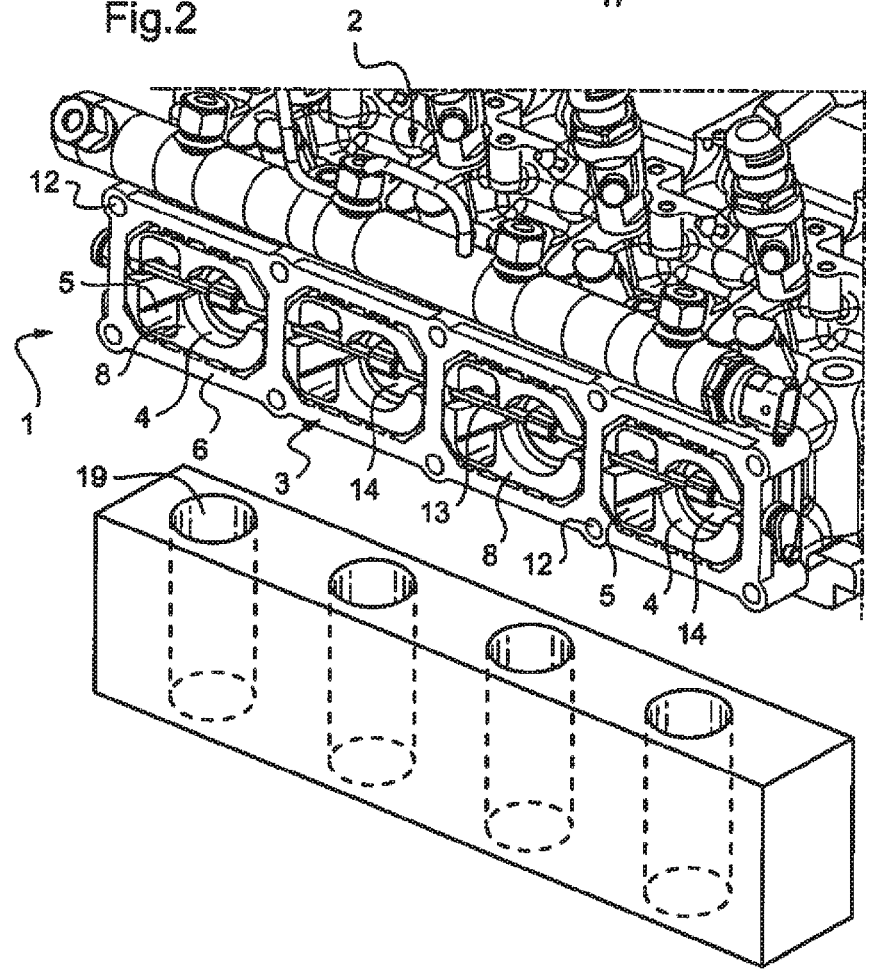

GAS INTAKE SYSTEM FOR A VEHICLE ENGINE

The invention relates to a gas intake system for an internal combustion engine.

Internal combustion engines comprise cylinders defining combustion chambers and are often provided with control devices, making it possible to regulate the gas flows conveyed into said cylinders in order to optimize the conditions of combustion in said chambers during the different phases of travel of the vehicle. This optimization is obtained by the presence of gas supply ducts located upstream of said cylinders and configured to create specific swirling movements in the combustion chambers, such as for example, the "swirl" current. Via this current, a rotational speed about the axis of revolution of the cylinder is transmitted to the fresh gases introduced into the combustion chambers during the intake phase, in order to improve the homogeneity of the fresh gas-fuel mixture. Specifically, said "swirl" current is generally obtained by means of two supply ducts per cylinder, including a principal duct and a secondary duct, the closure of the principal duct leading to the creation of said current. The flow rate of the gas passing through the principal ducts is regulated by pivoting flaps mounted on a shaft, said flaps permitting said principal ducts either be to opened completely or to be sealed partially or completely. It is thus particularly important to control carefully the different gas flows introduced into the cylinders over time in order to obtain at any moment the different desired effects in a precise and well-controlled manner. Although the gas injected into said cylinders most often consists of air, the general term "gas" is used throughout the description in order to take into account, for example, the presence of a high pressure EGR (Exhaust Gas Recirculation) circuit, capable of re-injecting upstream of the cylinders exhaust gases which have already been subjected to combustion.

Gas intake systems which are provided with a device for controlling the incident gas flows to the cylinders are in existence and have already been the subject of patents. For example, it is possible to cite the patent EP 0726388 which relates to such a system and of which the device for controlling the gas flows introduced into the cylinders comprises a pivoting shaft, enclosed between two half shells and provided with flaps, the rotation of said shaft to a greater or lesser extent simultaneously resulting in the rotation to a greater or lesser extent of the flaps, the inclination thereof regulating the incident gas flow to each cylinder or causing the interruption thereof. The main drawback with this type of control device is that it has a fixed geometry, provided for a single configuration of engine, and that it is not possible to be modified easily and rapidly to be adapted to a different type of engine.

The gas intake systems according to the invention are provided with a device for controlling the incident gas flows to the inlet of the cylinders of an internal combustion engine of a vehicle, which may be easily adapted to a specific configuration of engine. More specifically, said device is adjustable by means of small modifications which are simple and rapid to implement to make it highly efficient relative to a plurality of engines which are differentiated from one another by the positioning and the geometry of their cylinders. In this manner, as such a control device may be adjusted by small modifications, without requiring the complete re-machining thereof, it remains highly efficient for a small cost.

The subject of the invention is a gas intake system for an internal combustion engine of a vehicle comprising cylinders, said system being provided with a device for controlling the ingress of said gases to the cylinders, taking the form of a compartmentalized guide part, each compartment comprising a principal duct and a secondary duct for gas, in addition to a mobile flap designed to regulate the passage of the gases in the principal duct, each flap being pivotably mounted about a shaft passing through the guide part, and said part being fixed to the engine so that each compartment is facing a cylinder. The principal feature of an intake system according to the invention is that the device for controlling comprises a support part with compartments, a shaft provided with flaps, and a plurality of modules each defining a principal duct and a secondary duct and being capable of occupying the compartments, the support part, the shaft and each module constituting separate parts designed to be mounted onto one another. In this manner, the device for controlling is broken down into a plurality of parts having their own function:
- a support part serving for fixing the device for controlling to the engine,
- a shaft provided with flaps ensuring the sealing or opening of the principal ducts,
- a plurality of modules serving to guide and conduct the gases to each cylinder.

The aforementioned parts may thus be modified individually or in a grouped manner, to permit the device for controlling to be adapted to an engine having cylinders with a specific arrangement and/or geometry. The flaps may be controlled, either simultaneously or individually and independently of one another. Their position along the shaft is also easily adjustable without complicated handling or the use of a sophisticated tool. Each module may be modified so as to change the dimensions of the two ducts which it defines in addition to their respective positioning inside said module. The modules may all be changed at the same time or changed individually according to requirements. By being broken down into a plurality of parts, the device for controlling an intake system according to the invention may thus be easily adapted to a specific configuration of engine, by means of more or less significant modifications carried out to one or more of said parts constituting said device for controlling. It should be noted that the position of the flaps on the shaft has to be adjusted to the position of the principal ducts of the modules, once said modules have been placed in the compartments, so that they may cooperate therewith in an efficient manner. It is noteworthy that a further significant advantage obtained by a device for controlling according to the invention is that all the parts constituting said device are reversibly mounted onto one another. In other words, once the device for controlling is assembled, it may be easily dismantled partially or completely, by means of the rapid and simple detachment of said parts.

Advantageously, each compartment comprises a base having a first opening corresponding to the principal duct and a second opening corresponding to the secondary duct. The contour of said openings is similar to the contour of the principal duct and the secondary duct, and each module is inserted into a compartment so as to make the two ducts thereof correspond with the corresponding openings of the compartment. Said openings make it possible to ensure continuity with the supply ducts of each module, whilst guaranteeing a good seal.

Preferably, the first opening is circular and the second opening is rectangular. In this manner, the principal duct is cylindrical and the secondary duct is of parallelepipedal shape. The choice of a principal duct of circular section is justified by the fact that it entails the positioning of a circular flap to seal said duct. More specifically, a flap of circular shape is easier to machine than any other type of flap. Moreover, a circular flap applied to a circular end of a principal duct promotes a better seal when it is located in a sealed configuration.

Preferably, all the compartments are aligned in succession with one another in the support part, two successive compartments being separated by a wall comprising a groove, said grooves being aligned along the same axis to define a discontinuous rectangular channel capable of receiving the shaft. Each groove is able to be assimilated into a rectilinear slot and all the grooves are designed to receive the shaft. The support part thus serves to retain the shaft in the device for controlling in a predetermined position.

Advantageously, the position of the flaps is able to be regulated along the shaft. This possibility of additional regulation slightly increases the flexibility of use of the device for controlling by multiplying the possible configurations of said device. It makes it possible, in particular, to adapt the spacing between two successive flaps to the distance separating two successive cylinders of an engine.

Advantageously, the distance separating two successive flaps is constant along the shaft. This embodiment is applicable to an engine comprising cylinders separated by identical distances, which is usually the case.

Preferably, all the flaps mounted on the shaft are parallel with one another. In this manner, all the flaps simultaneously adopt the same position relative to the principal ducts, this embodiment representing the same strategy for injecting gas from one cylinder to another.

Preferably, each module consists of a part, the contours thereof being similar to those of the compartments, such that each module is able to be nested in each compartment. Each module, having a principal duct and a secondary duct, may thus be replaced by a module of the same geometry and the same dimensions but having a modified principal duct and secondary duct. In this manner, a device for controlling which comprises several modules offers a plurality of possible combinations in terms of said modules, thus making it possible to increase greatly the possible implementations of said device. Compared to a configuration of the device for controlling in which the modules and the support part might constitute one and the same part, the device for controlling an intake system according to the invention is much more advantageous in that it may be broken down into a significant number of variants by a simple replacement of modules, and without having to be completely re-machined. The nesting of each module in the corresponding compartment may be carried out by force or by allowing a clearance to remain.

Advantageously, each module is provided with a cylindrical principal channel and a parallelepipedal secondary channel.

The invention also relates to a method for mounting a device for controlling the ingress of gases to an internal combustion engine, said device belonging to an intake system according to the invention. The principal feature of a mounting method according to the invention is that it comprises the following steps:
the shaft provided with flaps is placed in the compartmentalized support part, such that each flap is located at the base of each compartment,
each module is introduced separately into each compartment of the support part, so as to make the principal duct correspond with the flap, the shaft being located between said support part and each of said modules, fixing each module in each compartment,
fixing the assembled device for controlling to the engine.

Advantageously, the device for controlling is fixed to the engine so that each compartment is facing a cylinder, each flap being located between each cylinder and each module, and partially defining each of said cylinders.

The gas intake systems according to the invention have the advantage of being flexible in use, as they use a device which is modular for controlling the ingress of gases to the cylinders. More specifically, as said device consists of a plurality of separate parts, it may be easily adapted to a specific configuration of engine, by modifications being made only to certain parts which constitute said device, without having to carry out a complete re-machining of said device. The device for controlling also has the advantage of being able to be easily dismantled, either completely or partially, for the purpose of being reused in a different configuration.

The invention also relates to a device for controlling the ingress of intake gas to an engine, in particular an internal combustion engine of a vehicle comprising cylinders, said device being in the form of a compartmentalized guide part, each compartment comprising a principal duct and a secondary duct for gas, characterized in that the device for controlling comprises a plurality of modules, each defining a principal duct and a secondary duct, and in that the modules constitute separate parts designed to be mounted onto one another.

In other words, the modules are separate parts designed to be fixed together after a mounting operation.

The device may have any one of the features set forth above for the device for controlling the above intake system.

In particular, in an embodiment of said device, each compartment also comprises a mobile flap provided to regulate the passage of the gases in the principal duct. Each flap (14) may be pivotably mounted about a shaft passing through the guide part.

In an embodiment of said device, all of the compartments are aligned in succession in the guide part, two successive compartments being separated by a wall comprising a groove and in that said grooves are aligned along the same axis to define a discontinuous rectilinear channel capable of receiving said shaft.

In an embodiment of said device, the guide part comprises a support part with compartments, the modules being capable of occupying said compartments. The support part and the modules constitute separate parts designed to be mounted onto one another.

The invention also relates to a gas intake system for an engine, in particular an internal combustion engine for a vehicle comprising cylinders, said system being provided with a device for controlling the ingress of gases according to the invention, a system in which the guide part of the device for controlling is configured to be fixed to the engine so that each compartment is facing a cylinder.

The invention further relates to a method for mounting a device for controlling according to the invention on an engine, characterized in that it comprises the mounting of the modules onto one another and the fixing of the device for controlling to the engine, each compartment being in front of a cylinder of the engine.

In one embodiment in which each compartment comprises a flap pivotably mounted about a shaft, the mounting method also comprises a step in which the shaft provided with flaps is placed in the compartmentalized support part, such that each flap is located in the base of each compartment. Each flap may be placed between each cylinder and each module and may partially define a cylinder.

In a variant of this embodiment in which the device further comprises a support part and modules, the contours thereof being similar to those of the compartments of the support part, the mounting method may comprise the following steps:

each module is introduced separately into each compartment of the support part, so as to make the principal duct correspond with the flap, the shaft being located between said support part and each of said modules;

fixing each module in each compartment.

A detailed description of a preferred embodiment of a gas intake system of an internal combustion engine of a vehicle is provided hereinafter, with reference to the figures of the accompanying drawings, in which:

FIG. 1 is a perspective exploded view of a device for controlling used in an intake system according to the invention and permitting the gas flows introduced into the cylinders of an engine to be regulated, FIG. 2 is a perspective view of an intake system according to the invention, mounted on an internal combustion engine of a vehicle and showing the assembled device for controlling of FIG. 1.

For the detailed description of a preferred embodiment of a gas intake system according to the invention, it is assumed that the gas injected into the cylinders of the engine 2 consists of air.

With reference to FIGS. 1 and 2 an air intake system 1 according to the invention permits the supply of air to four cylinders 19 of an engine 2 of an internal combustion engine of a vehicle, said cylinders 19 defining combustion chambers in which the mixing of the fresh air/fuel takes place. This intake system 1 involves the use of a device for controlling 3 the incident airflows intended to be supplied to each cylinder 19, in order to create swirling movements, in particular inside the combustion chambers, with a view to homogenizing the air/fuel mixtures. Amongst said swirling movements, the "swirl" current is particularly desirable, consisting of transmitting a rotational speed about the axis of revolution of the cylinder to the fresh air introduced into the combustion chambers during the intake phase, as it greatly contributes to improving the mixing conditions between the air introduced and the fuel. This "swirl" current is generally obtained by means of a principal duct 4 and a secondary duct 5 located upstream of each cylinder 19, the closure of the principal duct leading to the creation of the "swirl" current.

With reference to FIG. 1, the device for controlling 3 consists of a support part 6 in one piece, a sealing member 7 and four separate supply modules 8. The support part 6 is an elongated part, able to be assimilated into a compartmentalized frame of rectangular shape and causing four identical compartments 9 to be created, aligned along their length. Each compartment is of substantially parallelepipedal shape and two successive compartments 9 are separated by a wall 10 comprising a groove 11 similar to a rectilinear slot, said grooves 11 inside the support part 6 being aligned along the same longitudinal axis of said support part 6 so as to form a rectilinear and discontinuous channel. Each compartment 9 is defined by a planar wall 16 forming the base of said compartment 9, said wall 16 having an opening of rectangular section and an opening of circular section 17. This support part 6 has a uniform thickness and is provided with two parallel rows, each having four orifices 12, said orifices 12 being positioned in the region of four apexes of each of the four compartments 9 and being designed to be passed through by fixing screws, two successive compartments 9 having two orifices 12 in common. The sealing member 7 consists of a shaft 13 on which four planar and circular flaps 14 are mounted, and the position thereof on said shaft 13 being adjustable by sliding thereon. In this manner, said flaps 14 may occupy a variable position along the shaft 13 in order to be adapted to a particular spacing of the cylinders 19 on the engine 2. Said flaps 14 are fixed to the shaft 13 by all being parallel with one another and thus pivoted simultaneously during the rotation of the shaft 13. The four supply modules 8 are all identical and are each designed to occupy a housing of the support part 6. A module 8 is able to be assimilated into a compact housing of substantially parallelepipedal shape and the contours thereof being similar to those of a compartment 9 of the support part 6, ideally in order to be able to be nested in the interior thereof. Each module 8 comprises a principal duct 4 and a secondary duct 5, the principal duct 4 being substantially cylindrical and the secondary duct 5 having a substantially rectangular section. Inside each module 8, the two ducts 4, 5 are placed adjacent to one another so that their axes of symmetry are parallel. Each module 8 has an orifice 15 provided to receive a fixing screw for the purpose of being secured to the support part 6. Each module 8 has to have a uniform external contour in order to be able to be nested in the support part 6. Conversely, the geometry of the two ducts 4, 5, the dimensions thereof as well as the arrangement thereof inside the same module 8 are adjustable. Each module 8 is also provided with notches 18 to interact with the shaft 13 of the sealing member 7.

With reference to FIG. 2, a method for mounting a device for controlling 3 an air intake system according to the invention and designed to regulate the incident flow of air in the cylinders 19 of the engine 2, comprises the following steps:

the shaft 13 provided with its flaps 14 is placed in the rectilinear and discontinuous channel consisting of the grooves 11 of the support part 6, such that each circular flap 14 is placed in front of the circular opening 17 of the base 16 of each compartment 9.

each module 8 is then separately moved into each compartment 9 of the support part 6, so as to permit its principal duct 4 to correspond with the flap 14, the shaft 13 being located between said support part 6 and each of said modules 8. The introduction of each module 8 into a compartment 9 corresponds to a positioning of the shaft 13 in the notches 18 of each of said modules 8.

fixing the modules 8 into the support part 6 by means of screws passing through the orifices 15 of said modules 8.

once assembled, the device for controlling 3 is fixed to the engine 2, also via screws, said fixing being carried out so that each compartment 9 is facing a cylinder 19 and so that each flap 14 is placed between each cylinder 19 and each module 8 and partially defines a cylinder 19.

Naturally, the invention is not limited to the examples described and is defined by the scope of the claims.

The invention claimed is:

1. A device for controlling the ingress of intake gas to an internal combustion engine of a vehicle, the combustion engine comprising cylinders;

said device taking a form of a compartmentalized guide part, comprising: a support part with a plurality of compartments, a shaft provided with flaps, and a plurality of modules each defining a principal duct and a secondary duct for the intake gas;

wherein the principal duct and the secondary duct are formed by each module of the plurality of modules, the modules being capable of occupying the compartments; and, wherein the support part, the shaft and each module constitute separate parts designed to be mounted onto one another.

2. The device as claimed in claim 1, wherein each compartment comprises a base having a first opening corresponding to the principal duct and a second opening corresponding to the secondary duct.

3. The device as claimed in claim 2, wherein the first opening is circular and the second opening is rectangular.

4. The device as claimed in claim 1, wherein each compartment further comprises a mobile flap provided to regulate the passage of the gases in the principal duct.

5. The device as claimed in claim 4, wherein each flap is pivotally mounted about the shaft passing through the guide part.

6. The device as claimed in claim 5, wherein ail the compartments are aligned in succession in the guide part, two successive compartments being separated by a wall comprising a groove, and wherein said grooves are aligned along a same axis to define a discontinuous rectilinear channel capable of receiving said shaft.

7. The device as claimed in claim 5, wherein a position of the flaps is able to be regulated along the shaft.

8. The device as claimed in claim 5, wherein a distance separating two successive flaps is constant along the shaft.

9. The device as claimed in claim 5, wherein all the flaps mounted on the shaft are parallel with one another.

10. The device as claimed in claim 1, wherein each module is provided with a cylindrical principal channel and with a parallelepipedal secondary channel.

11. The device as claimed in claim 1, wherein each module consists of a part, the contours thereof being similar to those of the plurality of compartments such that each module is able to be nested in each compartment.

12. A gas intake system for an internal combustion engine of a vehicle, the combustion engine comprising cylinders, the gas intake system comprising:
a device for controlling the ingress of the intake gas to the cylinders as claimed in claim 1, wherein the compartmentalized guide part of the device for controlling is configured to be fixed to the engine so that each compartment is facing a cylinder.

13. A method for mounting a device for controlling the intake gas as claimed in claim 1, the method comprising:
mounting of the plurality of modules onto one another; and fixing of the device for controlling the intake gas to the engine, each compartment being in front of a cylinder of the engine.

14. The method for mounting as claimed in claim 13, wherein each flap is pivotally mounted about the shaft passing through the compartmentalized guide part, and wherein the compartmentalized guide part comprises the support part with the plurality of compartments, the method further comprising a step in which the shaft provided with flaps is placed in the compartmentalized support part, such that each flap is located in the base of each compartment.

15. The method for mounting as claimed in claim 14, wherein each module is able to be nested in each compartment, the method further comprising:
introducing each module separately into each compartment of the support part to make the principal duct correspond with the flap, the shaft being located between said support part and each of said modules; and fixing each module in each compartment.

* * * * *